United States Patent
Nedlich

(10) Patent No.: US 8,167,315 B2
(45) Date of Patent: May 1, 2012

(54) MECHANICAL SEALING DEVICE, AND A PUMP

(75) Inventor: Henrik Nedlich, Sundbyberg (SE)

(73) Assignee: Roplan International AB, Tumba (SE)

( * ) Notice: Subject to any disclaimer, the term of this patent is extended or adjusted under 35 U.S.C. 154(b) by 306 days.

(21) Appl. No.: 12/599,237

(22) PCT Filed: May 7, 2008

(86) PCT No.: PCT/SE2008/050526
§ 371 (c)(1),
(2), (4) Date: Nov. 6, 2009

(87) PCT Pub. No.: WO2008/136757
PCT Pub. Date: Nov. 13, 2008

(65) Prior Publication Data
US 2010/0254840 A1    Oct. 7, 2010

(30) Foreign Application Priority Data
May 7, 2007    (SE) ....................... 0701091

(51) Int. Cl.
*F16J 15/38*    (2006.01)
*F16J 15/36*    (2006.01)

(52) U.S. Cl. ...................... 277/390; 277/393

(58) Field of Classification Search .............. 277/358, 277/370, 390, 393, 551, 576, 371
See application file for complete search history.

(56) References Cited

U.S. PATENT DOCUMENTS

| | | | | |
|---|---|---|---|---|
| 2,785,913 A | * | 3/1957 | Solari | 277/397 |
| 2,888,280 A | * | 5/1959 | Meyer et al. | 277/391 |
| 3,291,493 A | | 12/1966 | Blair | |
| 3,441,284 A | * | 4/1969 | Walker et al. | 277/370 |
| 3,961,799 A | * | 6/1976 | Peet | 277/370 |
| 4,261,581 A | * | 4/1981 | Hershey | 277/370 |
| 4,779,876 A | * | 10/1988 | Novosad | 277/397 |
| 5,071,318 A | * | 12/1991 | Bice et al. | 415/230 |
| 5,344,164 A | * | 9/1994 | Carmody et al. | 277/371 |
| 5,354,070 A | * | 10/1994 | Carmody | 277/370 |
| 5,370,401 A | * | 12/1994 | Sandgren | 277/306 |
| 5,375,852 A | * | 12/1994 | Charhut | 277/371 |
| 5,538,259 A | * | 7/1996 | Uhrner et al. | 277/370 |
| 5,758,880 A | | 6/1998 | Ice et al. | |
| 5,984,313 A | * | 11/1999 | Kraus | 277/396 |

(Continued)

FOREIGN PATENT DOCUMENTS

EP    0 283 335    9/1988

(Continued)

*Primary Examiner* — Vishal Patel
(74) *Attorney, Agent, or Firm* — Hovey Williams LLP

(57) ABSTRACT

A mechanical sealing device and a pump including a mechanical sealing device are described. The sealing device includes a first seal element (11) and a first holder element (12) holding the first seal element. The first seal element (11) forms a first seal surface (13), an opposite backing surface (14) and an outer peripheral surface (15). The first holder element has a support surface (16) and an inner surface (17). A second seal element (21), forming a second seal surface (22), is rotatable in relation to the first seal element around an axis (x) of rotation so that the first seal surface (13) abuts sealingly the second seal surface (22) in a radial plane. An elastomer element (30) is provided between the outer peripheral surface (15) and the inner surface. The opposite backing surface abuts tightly the support surface.

13 Claims, 3 Drawing Sheets

U.S. PATENT DOCUMENTS

| | | | |
|---|---|---|---|
| 6,568,687 B2 * | 5/2003 | Radosav | 277/389 |
| 6,655,694 B1 * | 12/2003 | Nakano | 277/370 |
| 6,962,340 B2 * | 11/2005 | Maruyama | 277/370 |
| 7,431,304 B2 * | 10/2008 | Dahlheimer | 277/370 |

FOREIGN PATENT DOCUMENTS

| | | |
|---|---|---|
| EP | 0798499 A1 | 10/1997 |
| EP | 1 098 117 | 5/2001 |
| GB | 2044862 A | 10/1980 |

* cited by examiner

MECHANICAL SEALING DEVICE, AND A PUMP

THE BACKGROUND OF THE INVENTION AND PRIOR ART

The present invention refers generally to mechanical sealing devices, including or forming a part of equipment comprising a rotating shaft extending through a passage to be sealed. More specifically, the present invention refers to a mechanical sealing device according to the preamble of claim 1, and to a pump according to the preamble of claim 13.

Such a mechanical sealing device can be used in a variety of applications. For instance, such a mechanical sealing device can be used in pumps for pumping a liquid. The first holder element may then be joined to the pump housing via a peripheral thread provided radially outside the first seal element. During operation, possible stresses in the pump housing can be transferred to the first seal surface via the thread, and thus create non planar states and consequently leakage.

By means of the elastomer element, provided between the outer peripheral surface of the first seal element and the inner surface of the first holder element, this problem could be remedied. Such a solution is disclosed in U.S. Pat. No. 3,291,493.

However, with this solution the elastomer element, which frequently is made of rubber, will come into contact with the liquid to be pumped. For hygienic reasons, such contact between the pump liquid and the rubber of the elastomer element is not desired in many applications, such as medical applications or in the food industry.

U.S. Pat. No. 3,291,493 discloses a mechanical sealing device comprising a first machine part and a second machine part. A first sealing ring is connected to the first machine part, and a second sealing ring is connected to the second machine part. The second sealing ring is surrounded by a gasket element extending around an inner corner of the sealing ring.

U.S. Pat. No. 5,758,880 discloses a mechanical sealing device incorporating a similar solution, where a ceramic sealing element is supported by an elastomer element extending around a corner of the sealing element.

EP-A-798499 discloses a further mechanical sealing device, which comprises a rotary seal element mounted on a shaft, and an opposite stationary seal element supported by a holder component via an elastomer ring. The elastomer ring extends also in this case around an inner corner of the stationary seal element.

GB-A-2044862 discloses a mechanical sealing device with a rotating seal element and an opposite stationary seal element supported in a housing via an O-ring.

SUMMARY OF THE INVENTION

The object of the present invention is to remedy the problems discussed above. Especially, it is aimed at a mechanical sealing device, which prevents stresses from the connection between the holder element and a housing to be transferred to the seal surface, and which avoids contact between an elastomer element and the medium to be sealed.

This object is achieved by the mechanical sealing device initially defined, which is characterized in that the opposite backing surface of the first seal element abuts tightly the support surface of the first holder element.

Since the opposite backing surface of the first seal element abuts tightly or sealingly the support surface of the first holder element, any medium to be sealed is efficiently prevented form reaching the elastomer element provided radially outside the abutment area between the opposite backing surface of the first seal element and the support surface of the first holder element. At the same time, the elastomer element permits the first seal element to perform slight movements along a radial plane, so that any possible transfer of stresses from the connection of the first holder element to any component, for instance an external component such as a housing, may be reduced or prevented.

According to an embodiment of the invention, the outer peripheral surface and the inner surface are concentric with the axis of rotation.

According to a further embodiment of the invention, the opposite backing surface and the support surface extends in a radial plane with respect to the axis of rotation. By means of such radial surfaces, the abutment between the backing surface and the support surface can be made very tight so that no media may pass through the abutment area.

According to a further embodiment of the invention, the first seal element comprises a surrounding groove, wherein the elastomer element comprises an annular flange extending inwardly into the groove. Such an annular flange of the elastomer element will thus be engaged in the surrounding groove so that the elastomer element is securely held between the outer peripheral surface of the first seal element and the inner surface of the first holder element during operation of the mechanical sealing device. Advantageously, the surrounding groove extends inwardly from the outer peripheral surface. In principal the surrounding groove may be provided anywhere on the outer peripheral surface. According to a preferred embodiment, the surrounding groove is disposed at a corner formed between the opposite backing surface and the outer peripheral surface.

According to a further embodiment of the invention, the first holder element comprises locking means adapted to secure the elastomer element between the outer peripheral surface and the inner surface, and to secure the backing surface tightly against the support surface. Such locking means can be provided as an alternative or a supplement to the surrounding flange and the annular groove. Advantageously, the locking means may comprise a locking flange projecting axially from the inner surface and being bent towards the outer peripheral surface. By such a bent flange, the elastomer element will be pressed against the outer peripheral surface of the first seal element and thus be securely held in the desired position. Furthermore, the outer peripheral surface of the first seal element may have an inclined surface portion tapering towards the first seal surface, wherein the locking flange may be provided opposite and outside the inclined surface portion.

According to a further embodiment of the invention, the first and second seal elements are manufactured in a material selected from the group comprising a metallic material, a ceramic material, a carbide material and a nitride material.

According to a further embodiment of the invention, the first holder element is manufactured in a rigid, non-elastic material.

According to a further embodiment of the invention, the first holder element is engaged in a housing by means of a thread engagement.

The object is also achieved by means of the pump initially defined, which is characterized in that the opposite backing surface of the first seal element abuts tightly the support surface of the first holder element. The first part may comprise a housing, engaging the first holder element by means of a thread engagement, and the second part may comprise a shaft.

BRIEF DESCRIPTION OF THE DRAWINGS

The present invention is now to be explained more closely through a description, by way of example, of various embodiments and with reference to the drawings attached hereto.

DETAILED DESCRIPTION OF VARIOUS EMBODIMENTS

Figure 1:
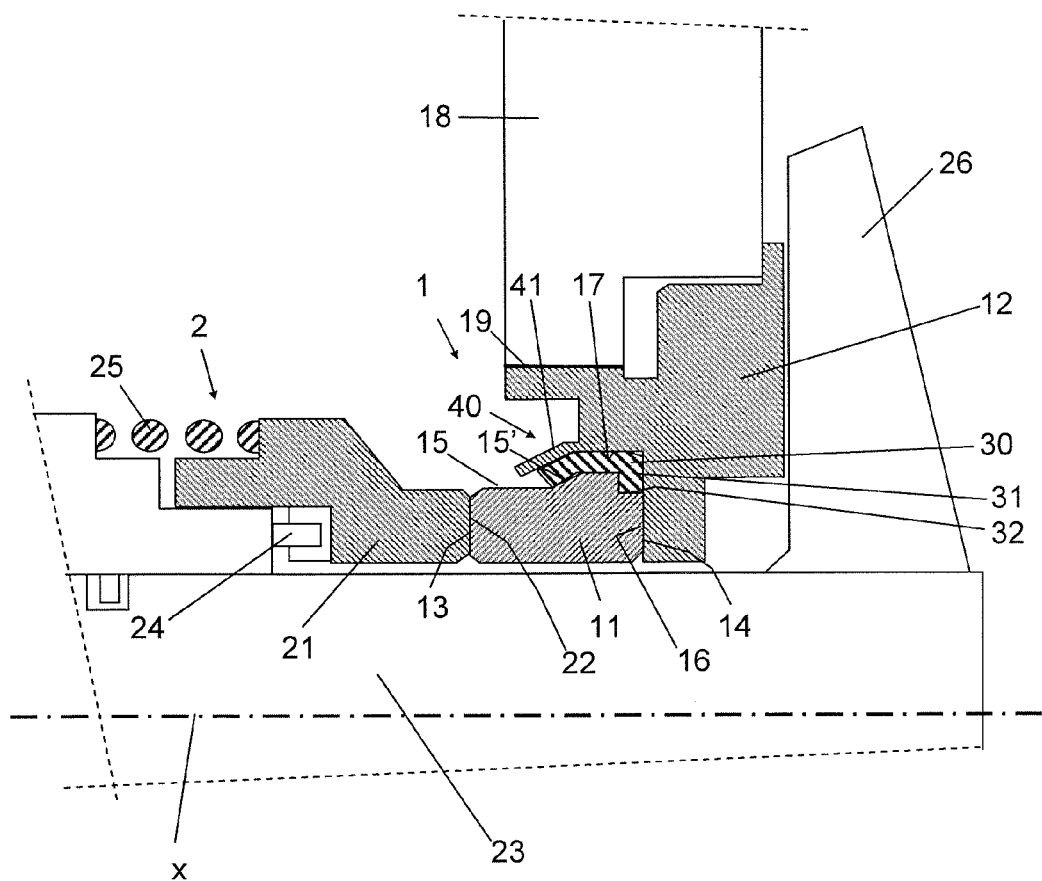
FIG. 1 discloses a sectional view through a mechanical sealing device according to a first embodiment of the invention.

FIG. 1 discloses a mechanical sealing device comprising a first part and a second part 2. In the embodiments disclosed, the mechanical sealing device is comprised in a pump. In the following description, this pump application will be described, although it should be noted that the mechanical sealing device could be used also in other applications comprising a rotating shaft extending through a passage in a housing or the like, e.g. a mixer or an agitator.

In the embodiments disclosed, the first part 1 is substantially stationary, whereas the second part 2 is rotating around an axis x of rotation. It is to be noted, however, that the first part 1 could be rotating and the second part 2 could be stationary or substantially stationary. It is also possible to let both the first part 1 and the second part be rotating at different rotary speeds.

The first part 1 comprises a first seal element 11 and a first holder element 12 for holding the first seal element 11. The first seal element 11 forms a first seal surface 13, an opposite backing surface 14 and an outer peripheral surface 15. The first seal surface 13 and the opposite backing surface 14 are parallel to each other and to a radial plane with respect to the axis x of rotation. The first holder element 12 has a support surface 16 and an inner surface 17. The outer peripheral surface 15 and the inner surface 17 are concentric with the axis x of rotation.

The first part 1 also comprises, or is mounted in, a housing 18. The housing 18 is in the embodiments disclosed stationary, or substantially stationary. The first holder element 12 is connected to the housing 18 by means of a thread engagement, schematically indicated at 19. The first holder element 12 comprises an outer peripheral thread engaged by an inner thread of an opening through the housing 18.

The second part 2 comprises a second seal element 21 forming a second seal surface 22. The second part 2 also comprises, or is mounted to, a rotary shaft 23. The second seal element 21 is axially displaceable along the axis x of rotation with respect to the rotary shaft 23, but is fixed to the rotary shaft 23 in a peripheral direction by means of any suitable coupling element 24.

During operation, the first part 1 with the first seal element 11 and the second part 2 with the second seal element 21 are rotary in relation to each other with respect to the axis x of rotation so that the first seal surface 13 abuts tightly and sealingly, during mutual rotation, the second seal surface 22 in a radial plane with respect to the axis x of rotation. The second seal element 21 is urged towards the first seal element 11 by means of a spring element 25.

The shaft 23 carries, in the pump application disclosed, a schematically indicated impeller 26.

As can be clearly seen in the figures, the opposite backing surface 14 of the first seal element 11 abuts the support surface 16 of the first holder element 12. Preferably, the surfaces 14 and 16 are planar, or substantially planar, and configured in such that a tight abutment is achieved, i.e. the surfaces 14 and 16 abut each other tightly or sealingly. Thanks to the spring element 25, the opposite backing surface 14 and the support surface 16 will be urged to tight abutment against each other.

The first part 1 also comprises an elastomer element 30 provided between the outer peripheral surface 15 of the first seal element 11 and the inner surface 17 of the first holder element 12. The first seal element 11 comprises a surrounding groove 31, which extends inwardly from the outer peripheral surface 15 and which, in the first embodiment, is disposed at a corner formed between the opposite backing surface 14 and the outer peripheral surface 15. The elastomer element 30 comprises an annular flange 32, which is complementary to the surrounding groove 31 and extends inwardly into the groove 31. In the first embodiment, the elastomer element 30 will thus abut the support surface 16 and the inner surface 17 of the first holder element 12. Thanks to the groove 31 and the annular flange 32, the elastomer element 30 will be secured in the surrounding annular space formed between the outer peripheral surface 15 of the first seal element 11 and the inner surface 17 of the first holder element 12.

In addition, the first holder element 12 may comprise locking means 40 adapted to secure the elastomer element 30 between the outer peripheral surface 15 and the inner surface 17. In the first embodiment the locking means 40 comprises a locking flange 41 projecting axially from the inner surface 17. When the first seal element 11 and the elastomer element 30 are mounted in the first holder element 12, the locking flange 41 is somewhat bent towards the outer peripheral surface 15 of the first seal element 11. This bending of the locking flange 41 further secures the elastomer element 30 in the annular space between the outer peripheral surface 15 and the inner surface 17. Preferably, the outer peripheral surface 15 may have an inclined surface portion 15' tapering towards the first seal surface 13. The locking flange 41 is provided opposite and outside the inclined surface portion 15' in order to extend substantially in parallel with the inclined surface portion 15'.

The elastomer element 30 may be manufactured in any suitable elastic polymer material, synthetic rubber or natural rubber.

The first seal element 11 and the second seal element 21 are preferably manufactured in a material selected from the group comprising a metallic material, a ceramic material, a carbide material and a nitride material. The first holder element 12 is preferably manufactured in a rigid, non-elastic material, for instance a metallic material.

Figure 2:
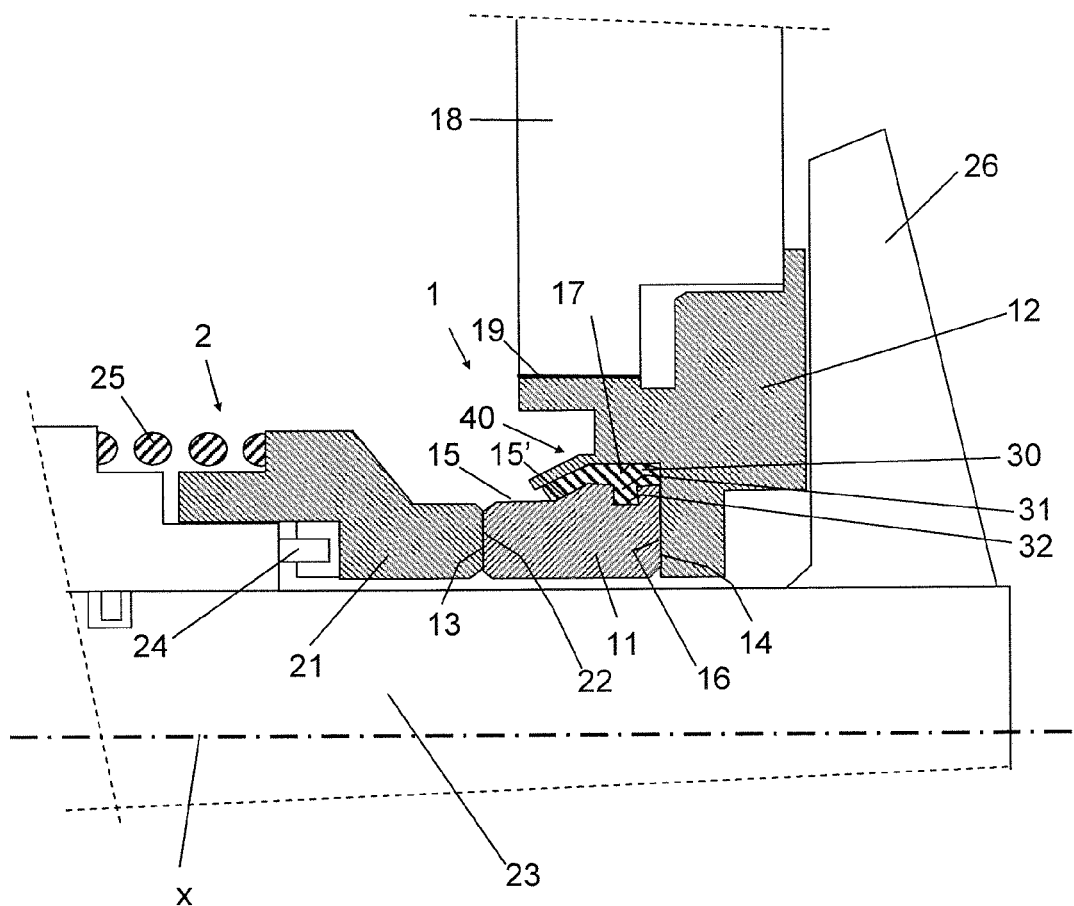
FIG. 2 discloses a sectional view through a mechanical sealing device according to a second embodiment of the invention.

FIG. 2 discloses a second embodiment, which differs from the first embodiment, merely in that the annular flange 32 of the elastomer element 30 extends from the outer peripheral surface 15 at a distance from the opposite backing surface 14.

Figure 3:
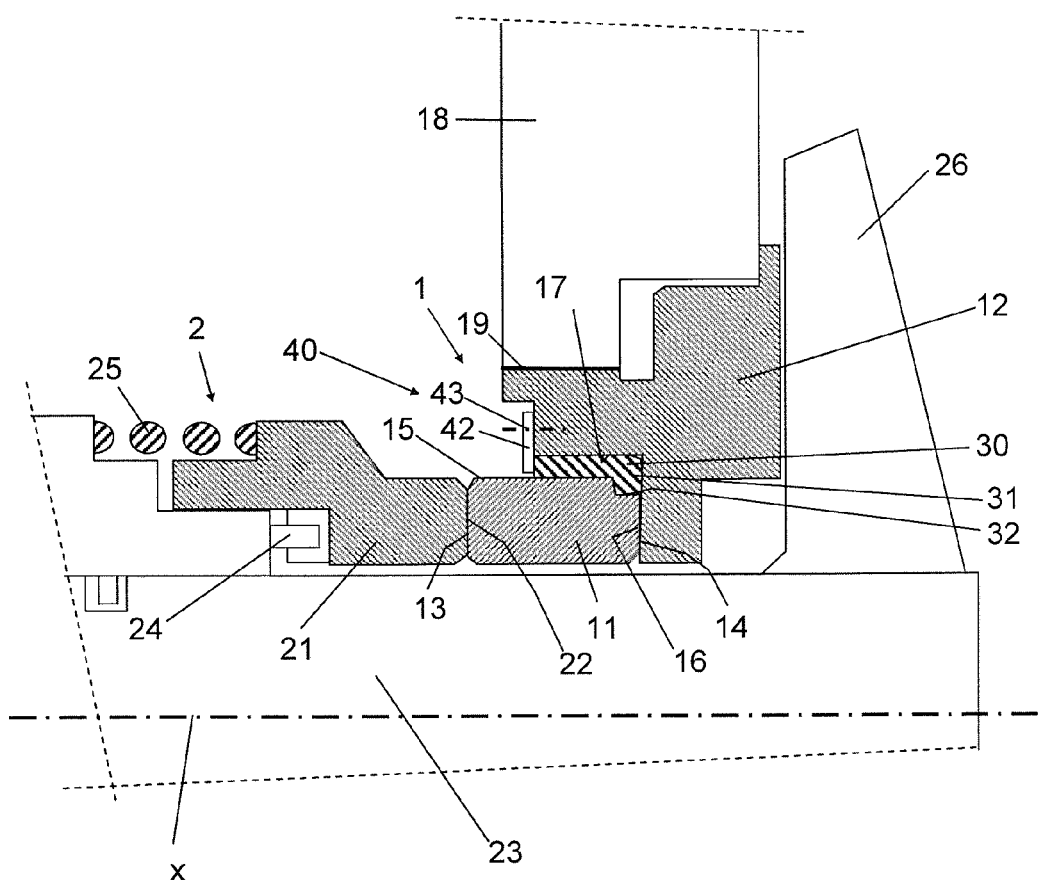
FIG. 3 discloses a sectional view through a mechanical sealing device according to a third embodiment of the invention.

FIG. 3 discloses a third embodiment, which differs from the first embodiment in that the locking means 40, instead of the locking flange 41, comprises a locking ring 42 extending along a radial plane with respect to the axis x of rotation and attached to the first holder element 12 by means of any suitable attachment, for instance a number of screws 43. According to the third element, it can also be dispensed with the inclined surface portion 15' of the outer peripheral surface 15 of the first seal element 11.

The invention is not limited to the embodiments disclosed but may be varied and modified within the scope of the following claims.

It is to be noted that the first seal element, first holder element and the elastomer element, as an alternative may be rotating and connected to the rotary shaft, whereas the second seal element is connected to the stationary housing.

The invention claimed is:

1. A mechanical sealing device, comprising:

a first part comprising a first seal element and a first holder element for holding the first seal element, wherein the first seal element forms a first seal surface, an opposite backing surface and an outer peripheral surface, and wherein the first holder element has a support surface and an inner surface; and a second part comprising a second seal element forming a second seal surface, wherein the first part and the second part are rotatable in relation to each other with respect to an axis of rotation so that the first seal surface abuts sealingly the second seal surface in a radial plane with respect to the axis of rotation, wherein an elastomer element is provided between the outer peripheral surface of the first seal element and the inner surface of the first holder element, wherein the opposite backing surface of the first seal element abuts tightly the support surface of the first holder element, wherein the first seal element comprises a surrounding groove, that the elastomer element comprises an annular flange extending inwardly into the groove and that the first holder element comprises a locking means adapted to secure the elastomer element between the outer peripheral surface and the inner surface, wherein the locking means comprises a locking flange abutting the elastomer element, projecting axially from the inner surface and being bent towards the outer peripheral surface, thereby pressing the elastomer element between the outer peripheral surface and the inner surface, and wherein the outer peripheral surface has an inclined surface portion tapering towards the first seal surface.

2. A mechanical sealing device according to claim 1, wherein the outer peripheral surface and the inner surface are concentric with the axis of rotation.

3. A mechanical sealing device according to claim 1, wherein the opposite backing surface and the support surface extend in a radial plane with respect to the axis of rotation.

4. A mechanical sealing device according to claim 1, wherein the surrounding groove extends inwardly from the outer peripheral surface.

5. A mechanical sealing device according to claim 4, wherein the surrounding groove is disposed between the opposite backing surface and the outer peripheral surface.

6. A mechanical sealing device according to claim 1, wherein the locking flange is provided opposite and outside the inclined surface portion.

7. A mechanical sealing device according to claim 1, wherein the first and second seal elements are manufactured from a material selected from the group consisting of a metallic material, a ceramic material, a carbide material and a nitride material.

8. A mechanical sealing device according to claim 1, wherein the first holder element is manufactured from a rigid, inelastic material.

9. A mechanical sealing device according to claim 1, wherein the first holder element is engaged in a housing by means of a thread engagement.

10. A pump comprising a mechanical sealing device, wherein the mechanical sealing device comprises:

a first part comprising a first seal element and a first holder element for holding the first seal element, wherein the first seal element forms a first seal surface, an opposite backing surface and an outer peripheral surface, and wherein the first holder element has a support surface and an inner surface; and a second part comprising a second seal element forming a second seal surface, wherein the first part and the second part are rotatable in relation to each other with respect to an axis of rotation so that the first seal surface abuts sealingly the second seal surface in a radial plane with respect to the axis of rotation, wherein an elastomer element is provided between the outer peripheral surface of the first seal element and the inner surface of the first holder element, wherein the opposite backing surface of the first seal element abuts tightly the support surface of the first holder element, wherein the first seal element comprises a surrounding groove, that the elastomer element comprises an annular flange extending inwardly into the groove and that the first holder element comprises a locking means adapted to secure the elastomer element between the outer peripheral surface and the inner surface, wherein the locking means comprises a locking flange abutting the elastomer element, projecting axially from the inner surface and being bent towards the outer peripheral surface, thereby pressing the elastomer element between the outer peripheral surface and the inner surface, and wherein the outer peripheral surface has an inclined surface portion tapering towards the first seal surface.

11. A pump according to claim 10, wherein the first part comprises a housing.

12. A pump according to claim 11, wherein the first holder element is engaged in the housing by means of a thread engagement.

13. A pump according to claim 10, wherein the second part comprises a shaft.

* * * * *